UNITED STATES PATENT OFFICE.

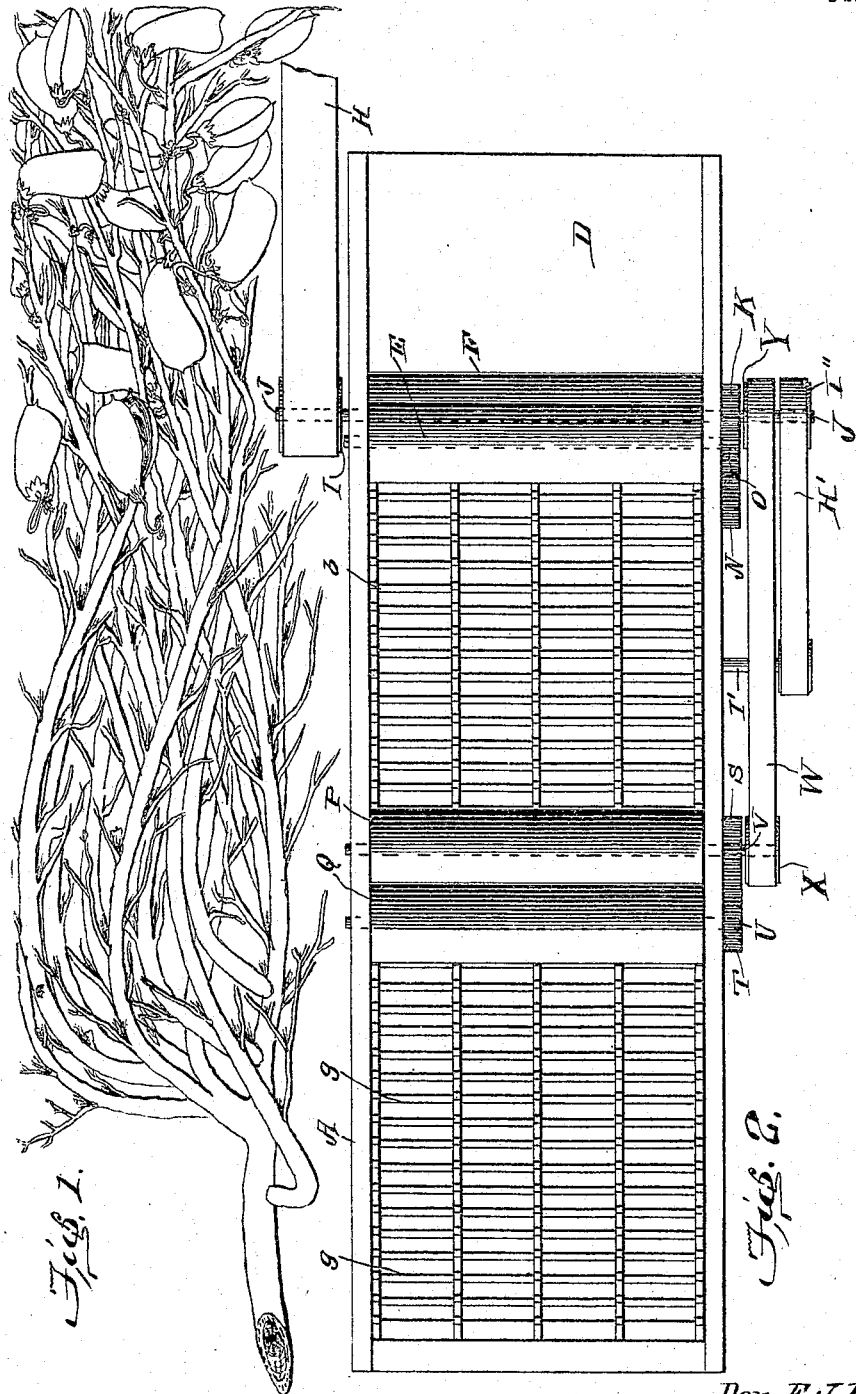

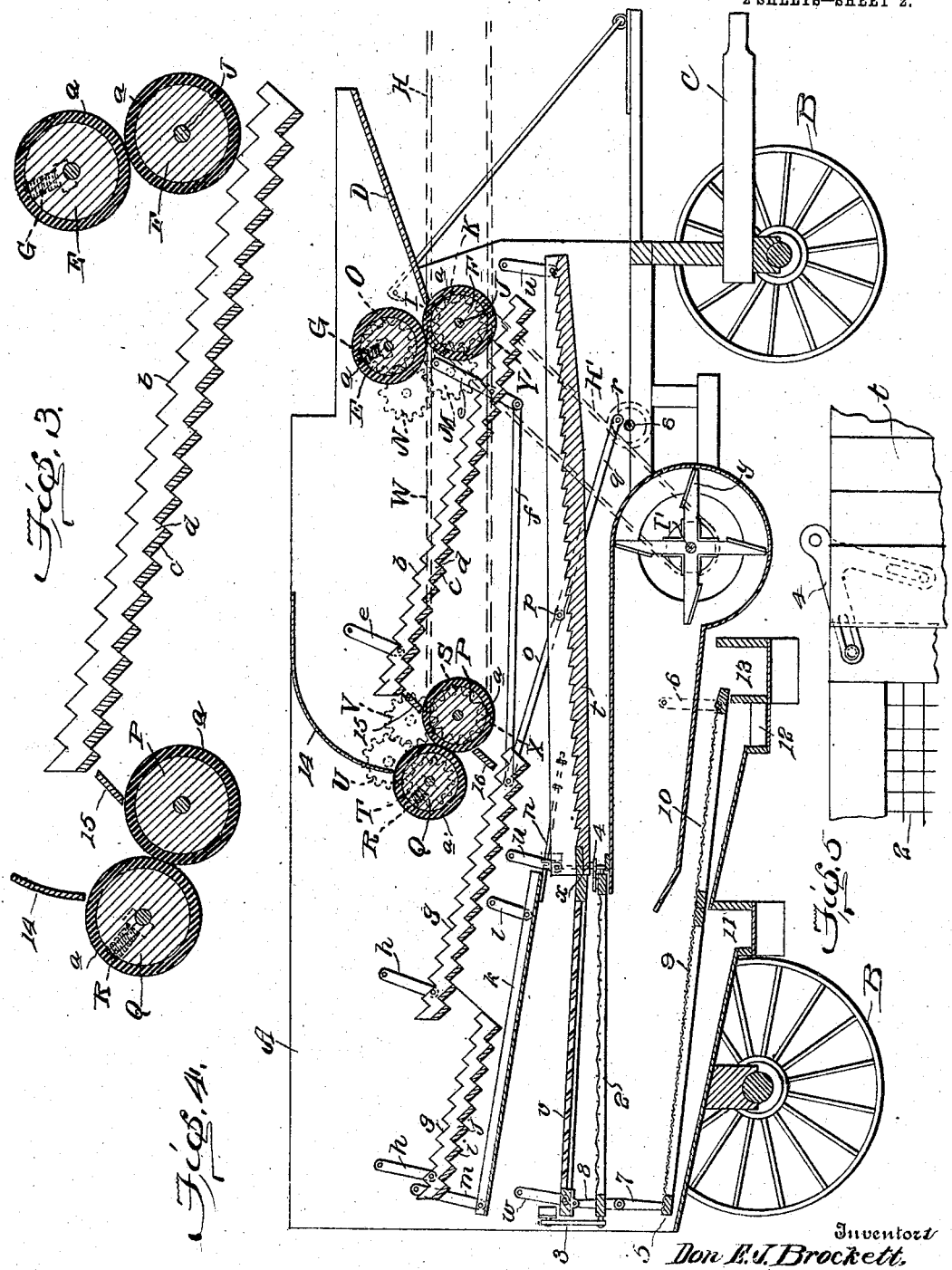

DON E. J. BROCKETT AND FRANK GARVER, OF MARION, OHIO, ASSIGNORS TO THE HUBER MANUFACTURING COMPANY, OF MARION, OHIO, A CORPORATION OF OHIO.

GARBANZON HULLING AND SEPARATING MACHINE.

942,053.   Specification of Letters Patent.   Patented Dec. 7, 1909.

Application filed October 5, 1905. Serial No. 281,388.

*To all whom it may concern:*

Be it known that we, DON E. J. BROCKETT and FRANK GARVER, citizens of the United States, residing at Marion, in the county of Marion and State of Ohio, have invented certain new and useful Improvements in Garbanzon Hulling and Separating Machines, of which the following is a specification, reference being had therein to the accompanying drawings.

This invention relates to garbanzon hulling and separating machines. Garbanzon is a plant which grows in Mexico, and in general appearance is very much like a tomato plant, in respect of its size and in being composed of numerous branches proceeding from a stem or body, except that the branches are more vine-like and winding and the body is shorter, with the branches proceeding thence from a point nearer the ground than in the case of the tomato plant, and except also that garbanzon bears pods, somewhat resembling, though shorter than, the pod of green peas, and in this pod is a single pea or kernel, unconnected (when ready for this treatment) with the pod and loose therein and of a firm and rather tough nature, when the plant is dry and the pod is approaching a somewhat crisp state, bendable, but tending to part into halves, particularly along the seam or line where the two halves of the pod are united. It is to hull these peas or kernels from these pods, as also to separate the peas or kernels from the broken pods and the vine-like stems of the plant, that our invention is designed. The mechanism to accomplish this result is illustrated in the accompanying drawing in the preferred form, though it is subject to modification in numerous particulars without departing from the spirit and the essence of the invention.

In these drawings, and on which like characters indicate corresponding parts, Figure 1 is a view of the garbanzon plant to be dealt with; Fig. 2, a plan view of the machine in its entirety; Fig. 3, an enlarged detail view in the nature of a section and a diagram showing the hulling rolls and an intermediate section of the separating mechanism, namely, a rack; Fig. 4, a vertical longitudinal sectional view of the entire machine, with the operating mechanism therein; and Fig. 5, a detail plan view of a portion of the chaffer board, the grain pan and the operating device by which the former is actuated through the motion of the latter.

In Fig. 1 will be seen a view or picture of
the garbanzon plant, the peas or kernels of
which are to be hulled from the pods and then separated from the particles of hulls and the vine-like branches of the plant, so that the peas can be separately gathered in a clean state. This plant grows in great quantities in Mexico, and our invention is designed specially for use in that country for the treatment of this plant, so that the kernel or pea may be commercially and economically collected for the uses to which it is put, and also so that the vine-like stems and remaining pieces of pod may be gathered up and used.

The letter A designates the general frame of our machine, which is in the nature of a casing or body mounted upon suitable ground wheels B and adapted, by a pole C, to be drawn from place to place after the manner of a grain threshing machine.

At D a hopper is formed to receive the plant and guide it as it is fed to the hulling rolls, of which a pair is shown at E and F. These rolls are mounted in the general frame, the upper roll E in a manner to permit of it yielding from its mate, so that it will accommodate itself to the varying thickness and condition of the plant as it is fed and drawn between the two rolls. This yielding bearing is suggested by the spring shown at G, the spring acting also to keep the upper roll against the lower roll with sufficient pressure for the purpose intended. These rolls are rotated in any convenient manner, but preferably by a belt H, which receives motion from the source of power and passes over a pulley I on the shaft J of the roll F. This shaft carries a spur gear K which meshes with an idler M, which in turn meshes with another idler N, which in its turn meshes with a spur gear O carried by the upper roll E. In this manner the upper roll can yield without becoming ungeared, and at the same time the two rolls will rotate in opposite directions, so that they will draw in and feed between and past themselves the plant. In all or most of our machines we include another pair of these hulling rolls, as seen at P and Q, which are mounted in like manner, the roll Q having a yielding bearing, as indicated by the spring

R, and both being geared together, as seen by the gears S, T, U and V, so as also to rotate in opposite directions and to draw in and feed between themselves the plant. This second pair of rolls is driven by a belt W, traveling on a pulley X on the shaft of the roll P, and on a pulley Y on the shaft of the roll F. The fan shaft I' receives motion from the belt H' on the pulley I'' on the shaft J. These several rolls each have, by preference, a smooth, but yieldable covering, indicated by the letter $a$ and preferably made of rubber. This covering takes a more ready hold upon the plant and its pods and at the same time yields or allows itself to be indented by the passage of the peas or kernels between the rolls in a manner to prevent not only breaking or flattening materially the peas or kernels, but to also prevent unduly marring or bruising them. The action of these rolls is to first draw in the plant and then to so mash and attack the pod that it will burst open or break into fragments, with the result that the pea or kernel is liberated. Such of the pods as are not sufficiently treated in the first pair of rolls or such of the peas or kernels as have not been extricated by the action of the rolls from their pods, will be completely treated and the separation effected by the action of the second pair of rolls. But between the two sets of rolls the plant, with its broken pods and unliberated peas or kernels, is subjected to an agitating and separating action by the means now to be set forth; as also to a similar action after being treated by the second rolls, together with a sifting operation and a separating treatment.

The letter $b$ designates a rack, a device in the nature of a straw rack in a threshing machine. It includes in its construction transverse slats or bars $c$ set in an inclined position, while the whole rack is also in an inclined position. Spaces $d$ are left between the slats for the passage of such of the peas or kernels as are either wholly liberated from their pods by the first pair of rolls or are nearly so liberated and are then liberated by the action of the rack. They fall from this rack $b$ to a pan in the nature of a grain pan, to be referred to later. The rack $b$ is hung upon pivoted links $e$, so that it will have a shaking motion imparted to it by a pitman $f$ operated by the rack $g$ hung upon pivoted links $h$. This rack bears the same relation to the second pair of rolls as the rack $b$ does to the first pair and performs substantially the same service. It is divided into two sections, in the form illustrated, but that is not material. It has similar slats $i$, with the spaces $j$, as in the case of the rack $b$. Whatever material does not go through the divisions of the rack $g$ passes out over the rear end of the last section of it. The broken pieces of pods and the kernels or peas, and any other matter which passes through, fall upon the return board $k$ mostly, and in part upon the grain pan. The return board is hung upon pivoted links $l$ and $m$ and receives motion from the grain pan $p$ by a rod $n$. The source of motion for the rack $g$ is a pitman $o$ connected thereto and to the grain pan $p$. At the same point another pitman $q$ is connected to the grain pan and at its other end to a wrist-pin on the disk $r$ on a shaft $s$, which receives rotary motion from any desired source.

The grain pan has a serrated bottom, as shown at $t$, and being reciprocated by the pitman $q$, as it is hung on pivoted links $u$, it acts to advance the kernels or peas with the chaff, made up of particles of pod and parts of broken stems, etc., over to the chaffer board, which itself is hung at one end on a pivoted link $w$ and connected at the other end $x$ to the grain board. In this way the chaffer board is reciprocated. It is a perforated structure, with inclined walls to the perforations. Its function is to separate the peas or kernels from whatever foreign matter and chaff has so far accompanied them, the peas going through the perforations with some finer particles of dust, dirt or chaff and the coarser particles going over the rear end of the chaffer board. In the meanwhile, the fan blower $y$ has blown away much of the chaff and fine foreign matter, so that what little falls upon the riddle or screen 2 with the peas, is then blown away. This riddle is hung at one end upon swinging links 3 and is supported by and connected to the grain pan $t$ at the other end, the connection consisting of a bell-crank lever 4, see Fig. 5 (one at each corner), the action of which is to vibrate or shake the riddle sidewise of the machine. Whatever particles of foreign matter go through this riddle are effectually blown away by the fan.

The next device is the sizing screen, composed of a frame 5 hung upon a pivoted link 6 at one end and a link 7 at the other, having an arm 8 connected with the chaffer board, so that the sizing screen will be given a longitudinal shaking motion. It has two sizes of screens, 9 and 10, the former sifting out the smallest of the peas or kernels and depositing them into the chute 11; and the latter sifting out the next or middle size peas or kernels and depositing them into the chute 12, while the largest size peas or kernels fall as tailings from the screen 10 into the chute 13.

A guard board 14 directs the overflow from the rack $b$, and guide boards 15 and 16, respectively, guide the material to and from the second pair of rolls.

Thus the operation of hulling and separating the garbanzon is completed. The work is done in a thorough and rapid manner and the peas or kernels come out in the several sizes indicated, and those of each size in a clean and satisfactory condition.

Having thus fully described our invention, what we claim as new and desire to secure by Letters Patent is:—

1. In a machine for treating garbanzon, the combination, with a feed hopper, a first pair of revoluble hulling rolls, one of which is yieldable from the other, and a shaking rack extending from this pair rearward, of a second pair of revoluble hulling rolls, one of which is yieldable from the other near the rear of said rack, a second shaking rack extending from the second pair of rolls rearward, a return board for said second rack, a grain board below the racks, a chaffer board beyond said grain board, and means for passing a current of air through and past said chaffer board.

2. In a machine for treating garbanzon, the following instrumentalities; a feed hopper, a first pair of revoluble hulling rolls, one of which is yieldable from the other, a shaking rack from this pair rearward, a second pair of revoluble hulling rolls, one of which is yieldable from the other, near the rear end of said rack, a second shaking rack beneath the second pair of rolls, a return board under the latter, a grain board below the racks, a chaffer board in continuation of the grain board, a riddle under the chaffer board, a fan blower adapted to blow a current past and through the riddle and chaffer board, and sizing screens beneath the riddle each having a separate chute.

3. In a machine for treating garbanzon, the combination, of a feed hopper and a pair of revoluble hulling rolls having their surfaces cushioned, with separating devices following said rolls and adapted to receive from them the garbanzon vine with the crushed bolls or pods and liberated seed, to separate the seed from the boll fragments and vine.

4. In a machine for treating garbanzon, the combination, of a feed hopper and a pair of revoluble rolls having their surfaces cushioned, a shaking rack extending rearward therefrom, a second pair of revoluble hulling rolls having their surfaces cushioned, and sifting or separating devices following said second pair of rolls.

In testimony whereof we affix our signatures in presence of witnesses.

DON E. J. BROCKETT.
FRANK GARVER.

Witnesses:
WILLIAM L. ULLOM,
W. R. SMITH,
ARTHUR J. GEHM,
O. A. PAULSRUD.